(12) United States Patent
Richardson et al.

(10) Patent No.: US 9,797,262 B2
(45) Date of Patent: Oct. 24, 2017

(54) SPLIT DAMPED OUTER SHROUD FOR GAS TURBINE ENGINE STATOR ARRAYS

(71) Applicant: United Technologies Corporation, Hartford, CT (US)

(72) Inventors: Carl S. Richardson, South Berwick, ME (US); Mark J. Rogers, Kennebunk, ME (US); Jonathan J. Earl, Wells, ME (US); Kenneth E. Carman, Kennebunk, ME (US); Richard K. Hayford, Cape Neddick, ME (US)

(73) Assignee: United Technologies Corporation, Farmington, CT (US)

( * ) Notice: Subject to any disclaimer, the term of this patent is extended or adjusted under 35 U.S.C. 154(b) by 374 days.

(21) Appl. No.: 14/286,510

(22) Filed: May 23, 2014

(65) Prior Publication Data

US 2015/0030443 A1    Jan. 29, 2015

Related U.S. Application Data

(60) Provisional application No. 61/858,949, filed on Jul. 26, 2013.

(51) Int. Cl.
| F01D 5/22 | (2006.01) |
| F01D 9/04 | (2006.01) |
| F01D 25/06 | (2006.01) |
| F01D 25/24 | (2006.01) |

(52) U.S. Cl.
CPC .............. *F01D 5/22* (2013.01); *F01D 9/041* (2013.01); *F01D 25/06* (2013.01); *F01D 25/246* (2013.01); *Y02T 50/672* (2013.01); *Y10T 29/49236* (2015.01)

(58) Field of Classification Search
CPC ... F01D 5/22; F01D 5/225; F01D 9/04; F01D 9/041; F01D 9/042; F01D 9/044; F01D 9/045; F01D 11/001; F01D 25/04; F05D 2220/32; F05D 2220/321; F05D 2220/323; F05D 2260/961
See application file for complete search history.

(56) References Cited

U.S. PATENT DOCUMENTS

| 4,361,213 A * | 11/1982 | Landis, Jr. | ............... F01D 11/02 188/378 |
| 4,875,830 A * | 10/1989 | Trousdell | ............... F01D 11/008 416/193 A |
| 5,215,435 A * | 6/1993 | Webb | ........................ F01D 5/08 277/414 |
| 5,441,385 A * | 8/1995 | Boyd | .................... F01D 25/246 415/209.2 |
| 5,584,654 A * | 12/1996 | Schaefer | .................. F01D 9/042 415/190 |
| 6,851,932 B2 * | 2/2005 | Lagrange | .................. F01D 5/22 416/190 |
| 7,172,199 B2 * | 2/2007 | Rogers | ...................... F01D 9/04 277/411 |

(Continued)

*Primary Examiner* — Dwayne J White
*Assistant Examiner* — Peter T Hrubiec
(74) *Attorney, Agent, or Firm* — O'Shea Getz P.C.

(57) ABSTRACT

A vane cluster includes a split damped outer shroud and an inner shroud spaced from the split damped outer shroud with a multiple of stator vane airfoils that extend between the split damped outer shroud and the inner shroud.

18 Claims, 13 Drawing Sheets

(56) References Cited

U.S. PATENT DOCUMENTS

| | | |
|---|---|---|
| 7,316,402 B2 * | 1/2008 | Paauwe ................. F01D 11/005 |
| | | 277/641 |
| 7,553,128 B2 | 6/2009 | Abdel-Messeh et al. |
| 7,572,098 B1 * | 8/2009 | Johnson ................. F01D 9/041 |
| | | 415/119 |
| 7,597,533 B1 | 10/2009 | Liang |
| 7,650,926 B2 | 1/2010 | Tholen |
| 7,665,962 B1 | 2/2010 | Liang |
| 7,686,068 B2 | 3/2010 | Tholen et al. |
| 7,704,039 B1 | 4/2010 | Liang |
| 7,874,792 B2 | 1/2011 | Tholen et al. |
| 7,959,407 B2 | 6/2011 | Tholen |
| 8,061,979 B1 | 11/2011 | Liang |
| 8,105,039 B1 * | 1/2012 | El-Aini ................... F01D 5/225 |
| | | 416/195 |
| 8,118,547 B1 | 2/2012 | Liang |
| 8,172,522 B2 * | 5/2012 | Shapiro .................. F01D 9/042 |
| | | 415/189 |
| 8,206,094 B2 * | 6/2012 | Seki ....................... F01D 5/225 |
| | | 415/191 |
| 2011/0044803 A1 * | 2/2011 | Di Paola .................. F01D 9/04 |
| | | 415/173.1 |
| 2013/0202423 A1 * | 8/2013 | Cloarec .................... F01D 5/26 |
| | | 415/191 |
| 2014/0248140 A1 * | 9/2014 | Jacques ................... F01D 9/042 |
| | | 415/183 |

* cited by examiner

SPLIT DAMPED OUTER SHROUD FOR GAS TURBINE ENGINE STATOR ARRAYS

CROSS-REFERENCE TO RELATED APPLICATIONS

This application claims priority to U.S. Provisional Patent Appln. No. 61/858,949 filed Jul. 26, 2013, which is hereby incorporated herein by reference in its entirety.

STATEMENT REGARDING FEDERALLY SPONSORED RESEARCH OR DEVELOPMENT

This disclosure was made with Government support under FA8650-09-D-2923 awarded by The United States Air Force. The Government has certain rights in this disclosure.

BACKGROUND

The present disclosure relates to a stator vane array and, more particularly, to a gas turbine engine split damped shroud.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The compressor section includes a case circumscribing an engine axis with axially alternating arrays of stationary vanes and rotatable blades. Each stator array may be constructed of multiple vane clusters distributed circumferentially about the interior of the case with each cluster supported by the case at an outer shroud.

Stator arrays may require some vane damping. Stator arrays are typically split between every vane at an inner shroud that also supports additional hardware such as a spring and separate Inner Air Seal (IAS) carrier. The additional hardware requires additional radial space. In some architectures this additional space may increase rotor thermal effect.

SUMMARY

A vane cluster is provided according to one disclosed non-limiting embodiment of the present disclosure. The vane cluster includes a split damped outer shroud. An inner shroud is spaced from the split damped outer shroud and a multiple of stator vane airfoils that extend between the split damped outer shroud and the inner shroud.

In a further embodiment of the present disclosure, the split damped outer shroud may include a split cut between each of the multiple of stator vane airfoils.

In a further embodiment of any of the foregoing embodiments of the present disclosure, each split cut may be about ten-thousandths of an inch wide (0.010"; 0.254 mm).

In a further embodiment of any of the foregoing embodiments of the present disclosure, a spacer key may be provided adjacent each split cut.

In a further embodiment of any of the foregoing embodiments of the present disclosure, each spacer key may extend between a forward hook and an aft hook of the split damped outer shroud.

In a further embodiment of any of the foregoing embodiments of the present disclosure, a shiplap may be provided that surrounds each spacer key.

In a further embodiment of any of the foregoing embodiments of the present disclosure, the spacer key may extend between each two of the multiple of split cuts.

In a further embodiment of any of the foregoing embodiments of the present disclosure, a pedestal may be provided that extends from the split damped outer shroud to at least partially support the spacer key.

In a further embodiment of any of the foregoing embodiments of the present disclosure, each spacer key may be generally U-shaped.

In a further embodiment of any of the foregoing embodiments of the present disclosure, each spacer key may define an interference fit interface between each of the multiple of stator vane airfoils.

In a further embodiment of any of the foregoing embodiments of the present disclosure, each spacer key may define an interface between each of the multiple of stator vane airfoils of one-thousandths of an inch wide (0.001"; 0.025 mm).

In a further embodiment of any of the foregoing embodiments of the present disclosure, each spacer key may define an interface between each of the multiple of stator vane airfoils of about zero.

In a further embodiment of any of the foregoing embodiments of the present disclosure, an anti-rotation feature may be provided that extends from the split damped outer shroud adjacent each of the multiple of stator vane airfoils.

In a further embodiment of any of the foregoing embodiments of the present disclosure, a seal land may be mounted directly to the inner shroud.

In a further embodiment of any of the foregoing embodiments of the present disclosure, a seal land may be brazed to the inner shroud.

In a further embodiment of any of the foregoing embodiments of the present disclosure, the seal land may be a full hoop.

A method of damping a stator array in a gas turbine engine is provided according to another disclosed non-limiting embodiment of the present disclosure. The method includes locating a multiple of split cuts in a split damped outer shroud to provide relative frictional movement between each of a multiple of stator vane airfoils; and locating a spacer key adjacent each of the split cuts.

In a further embodiment of any of the foregoing embodiments of the present disclosure, the method may include defining a shiplap at each of the multiple of split cuts.

In a further embodiment of any of the foregoing embodiments of the present disclosure, the method may include bridging each two of the multiple of split cuts with one of the spacer keys.

In a further embodiment of any of the foregoing embodiments of the present disclosure, the method may include anti-rotating the stator array at each of the multiple of stator vane airfoils.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
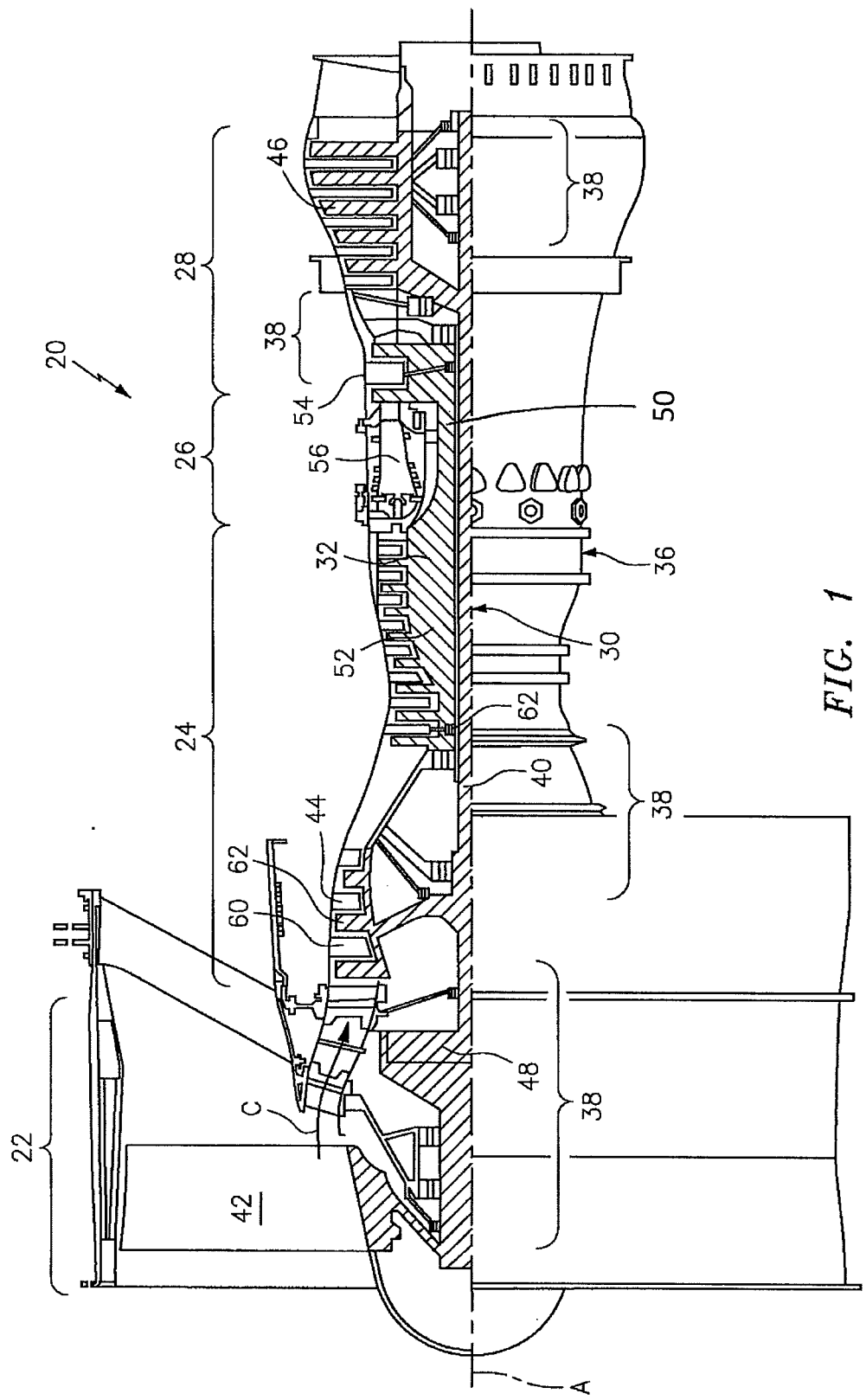
FIG. 1 is a schematic cross-section of an example gas turbine engine.
Figure 2:
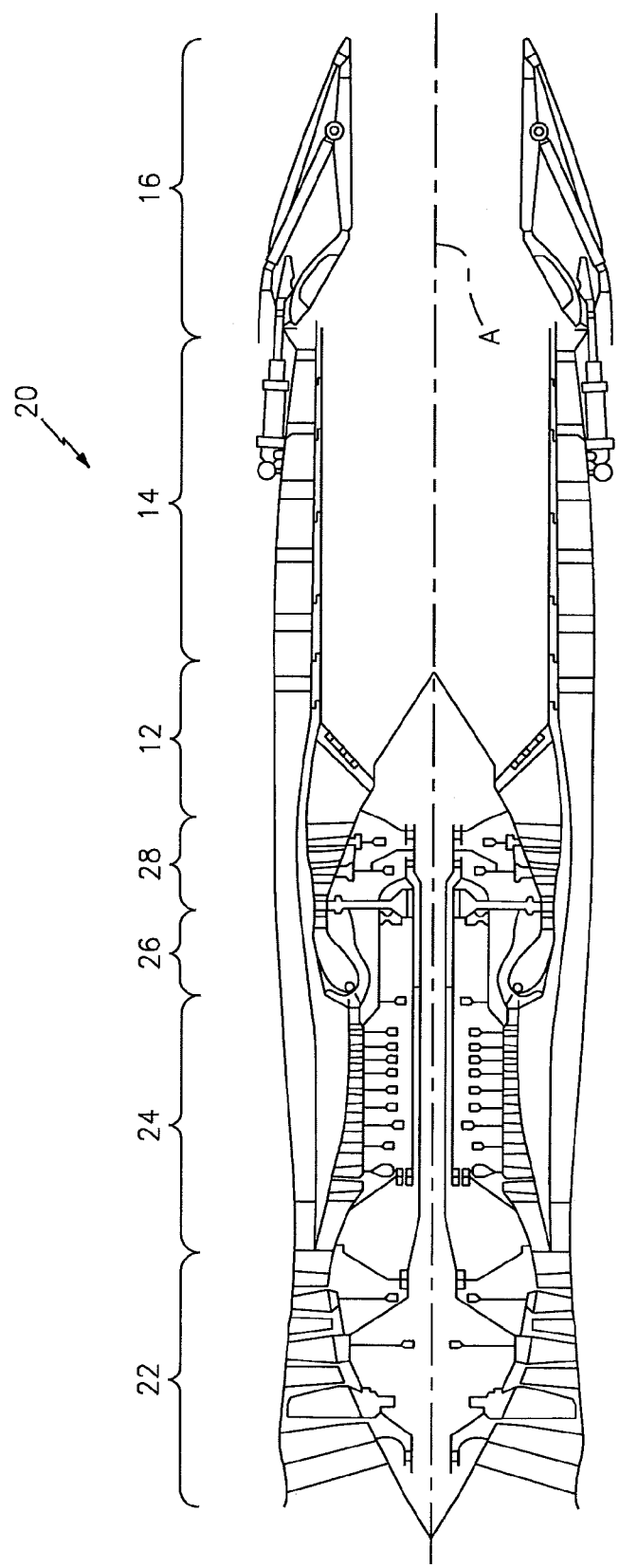
FIG. 2 is a schematic cross-section of another example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 20 might also include an augmentor section 12, an exhaust duct section 14 and a nozzle section 16 among other systems or features. Referring again to FIG. 1, the fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architectures such as turbojets, turboshafts, and three-spool (plus fan) turbofans where an intermediate spool includes an intermediate pressure compressor ("IPC") between a low pressure compressor ("LPC") and a high pressure compressor ("HPC"), and an intermediate pressure turbine ("IPT") between a high pressure turbine ("HPT") and a low pressure turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly, or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54 and 46 rotationally drive the respective low spool 30 and high spool 32 in response to the expansion. The main engine shafts 40 and 50 are supported at a plurality of points by the bearing structures 38 within the static structure 36. It should be understood, however, that various bearing structures 38 at various locations may alternatively or additionally be provided.

The HPC 52 includes a multiple of stages with alternate stationary stator arrays 60 and rotational rotor assemblies 62 along an airflow passage C. Although the HPC 52 is illustrated in the disclosed non-limiting embodiment, other engine sections will also benefit herefrom. Moreover, although a particular number of stages are illustrated, it should be appreciated that any number of stages will benefit herefrom.

Figure 3:
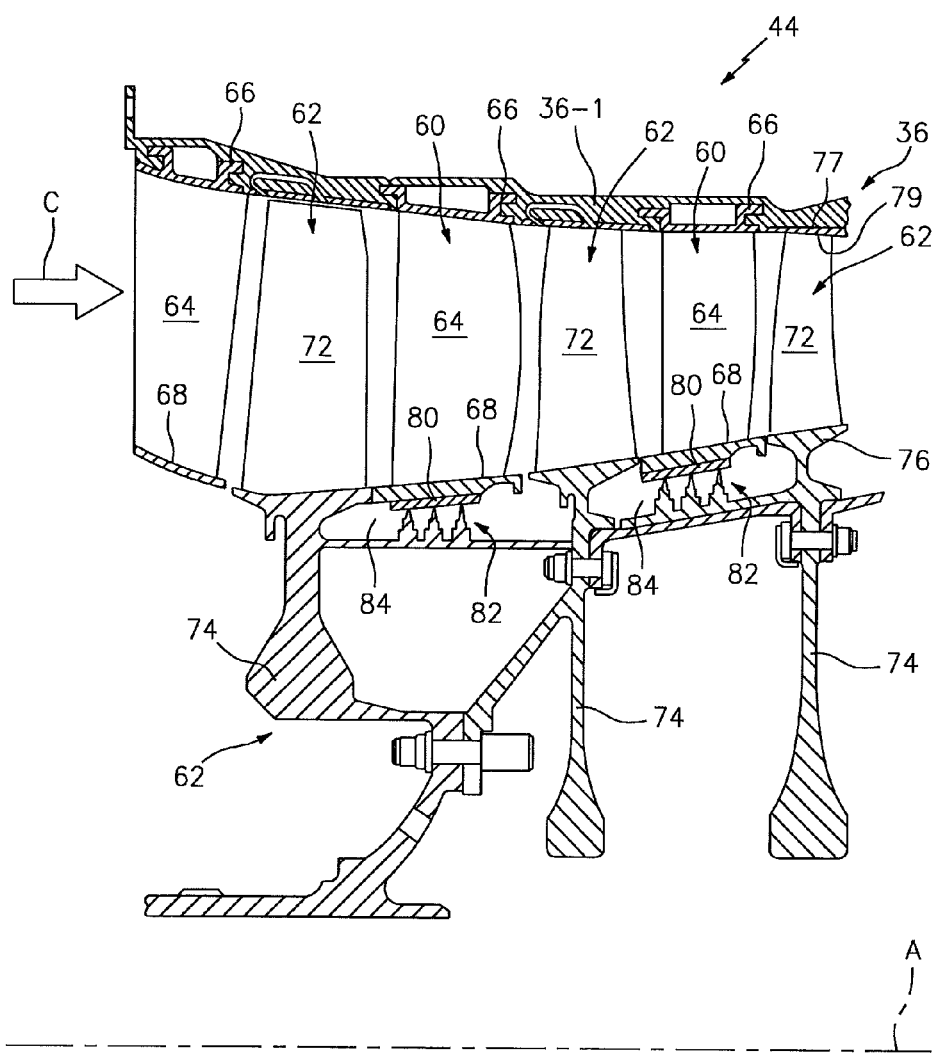
FIG. 3 is a schematic expanded cross-section of a portion of a high pressure compressor with a multiple of stator vane arrays.
Figure 4:
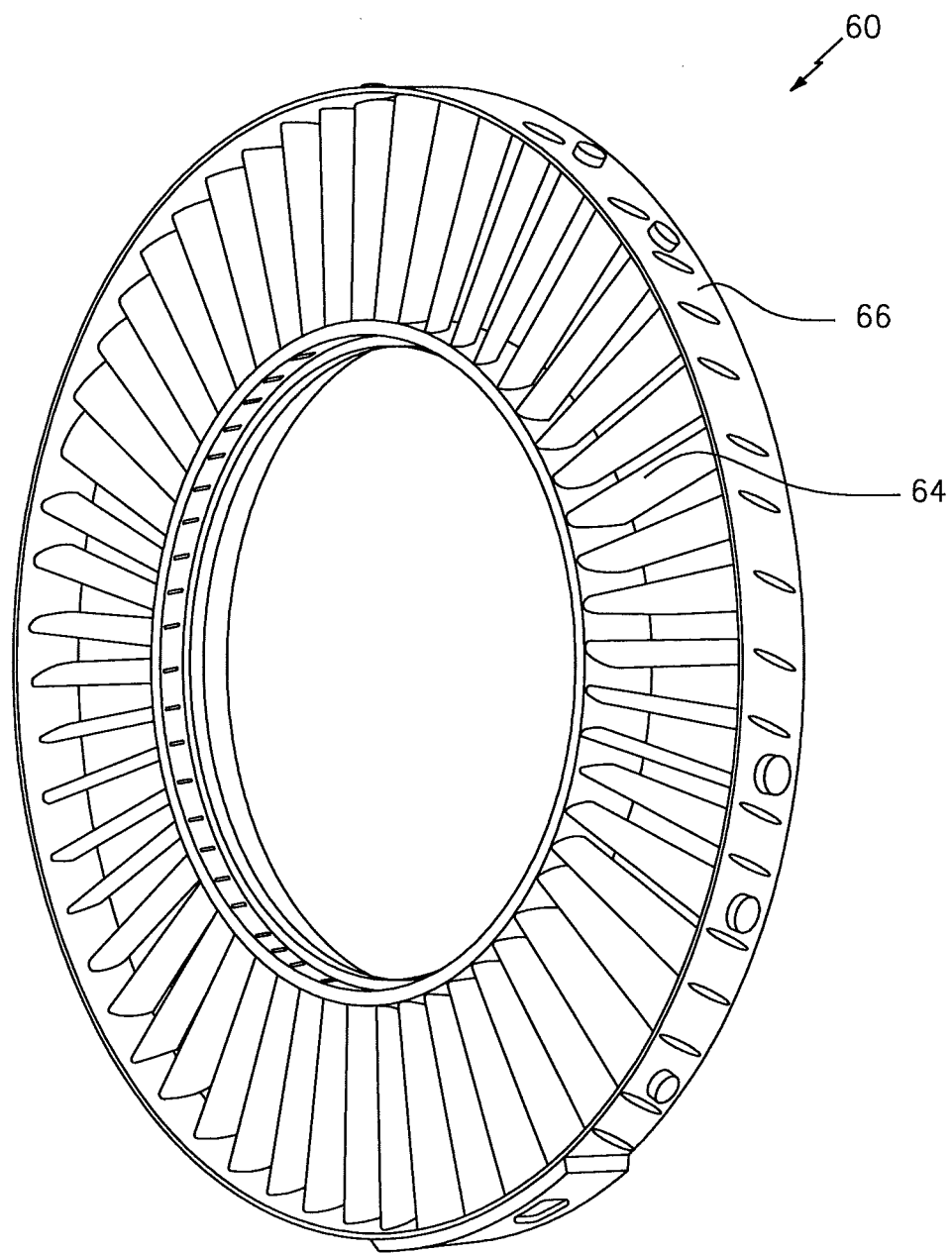
FIG. 4 is a perspective view of a stator array with a multiple of vane clusters.

With reference to FIG. 3, each stator array 60 (also shown in FIG. 4) includes a multiple of stator vane airfoils 64 that extend between a split damped outer shroud 66 and an inner shroud 68. The split damped outer shroud 66 is mounted to the engine static structure 36 such as engine case 36-1 via, for example, segmented hooks or other interfaces. Each stator array 60 is formed of a multiple of vane clusters 70 (see FIG. 5) that are individually or collectively anti-rotated within the engine case 36-1. The split damped outer shroud 66 and the inner shroud 68 of the stator arrays 60 bounds the airflow passage C. It should be understood that various numbers of vane clusters 70 and various mount interfaces with the engine case 36-1 will benefit herefrom.

Each of the rotor assemblies 62 includes a multiple of blades 72 supported by a respective rotor hub 74. A blade platform 76 that extends from each of the multiple of blades 72 and an Outer Air Seal 77 that supports a rub strip 79, which bounds the airflow passage C. The inner shroud 68 extends in a cantilever manner toward the engine central longitudinal axis A such that a seal land 80 is disposed in close proximity to the hub 74. A multiple of knife seals 82 extend from the hub 74 to engage the seal land 80 within a respective inner annular cavity 84. The seal land 80 may be manufactured of a honeycomb material into which the knife seals 82 cut. Provision for minimization of each inner annular cavity 84 facilitates increased engine efficiency.

Figure 5:
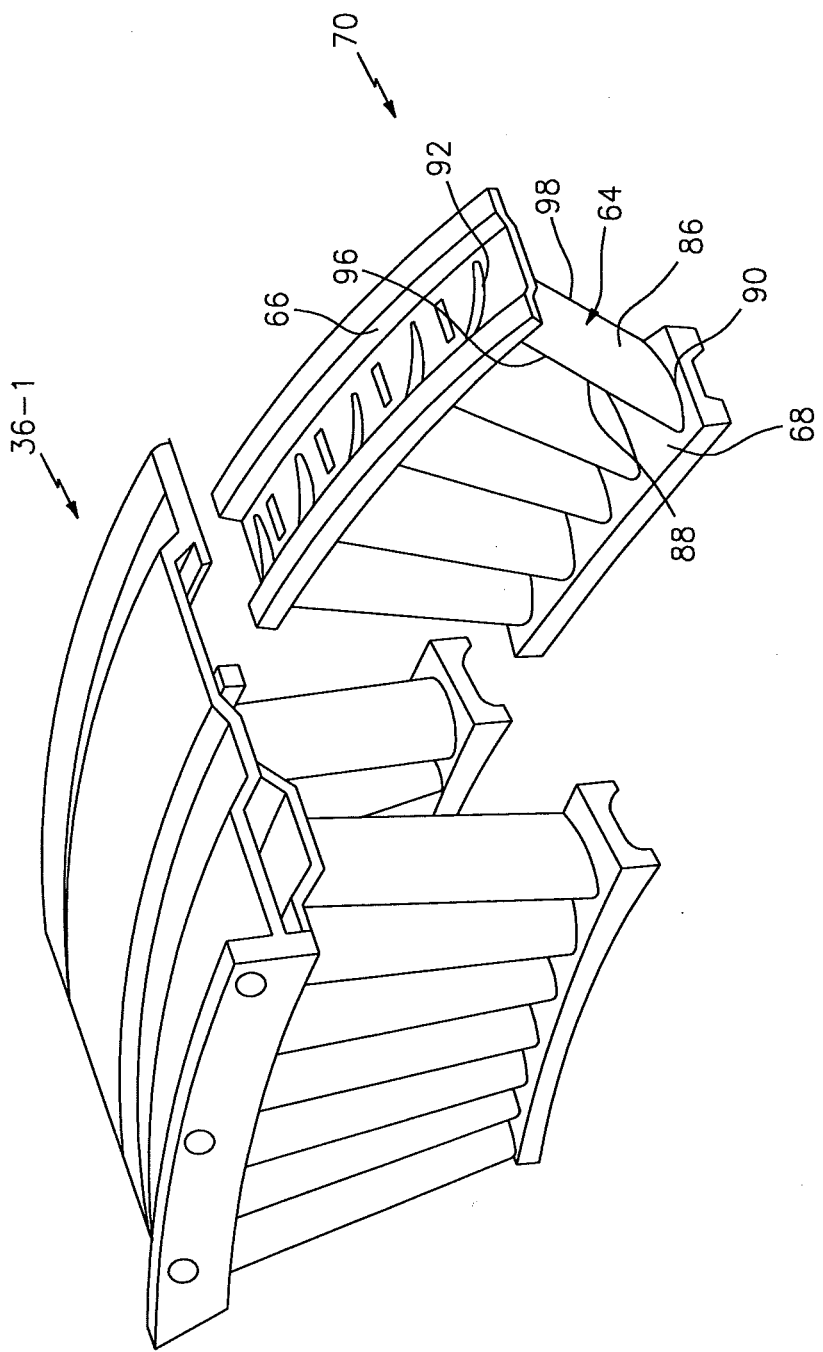
FIG. 5 is a perspective partial exploded view of a vane cluster.

With reference to FIG. 5, each stator vane airfoil 64 includes a first sidewall 86 that may be convex and defines a suction side, and a second sidewall 88 that may be concave and define a pressure side of the stator vane airfoils 64. The sidewalls 86 and 88 are joined at a leading edge 96 and at an axially spaced trailing edge 98. More specifically, the airfoil trailing edge 98 is spaced chordwise and downstream from the airfoil leading edge 96. The sidewalls 86 and 88, respectively, extend longitudinally or radially outward in span from an airfoil root 90 to a tip 92. Each vane cluster 70 may be manufactured from a metallic alloy such as, but not limited to, titanium or from a composite material.

Figure 6:
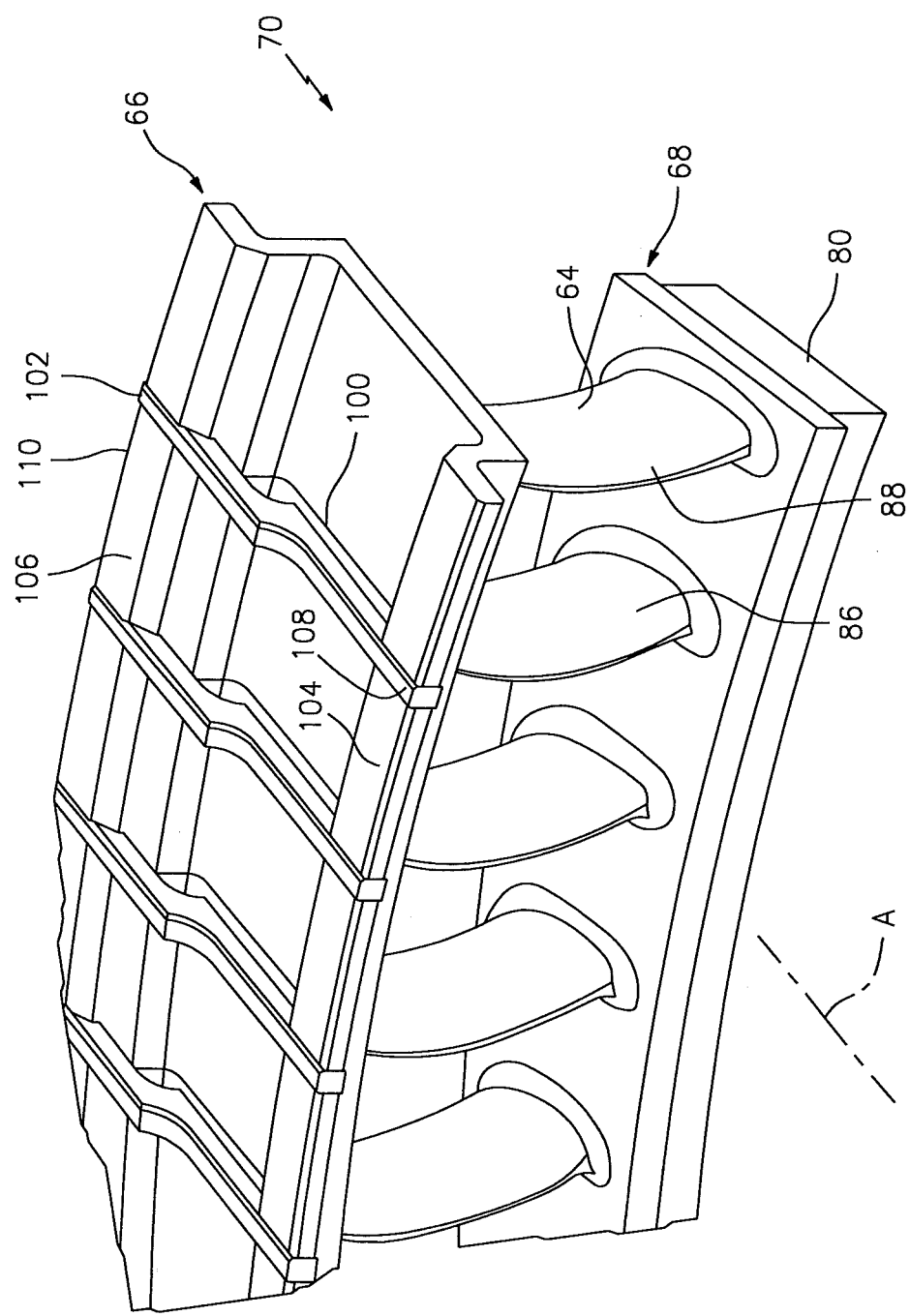
FIG. 6 is a perspective view of a split damped outer shroud for a vane cluster.

With reference to FIG. 6, according to one disclosed non-limiting embodiment, a split cut 100 is located through the split damped outer shroud 66 between each stator vane airfoil 64. The split cut 100 is located between the first sidewall 86 of one stator vane airfoil 64 and the second sidewall 88 of an adjacent stator vane airfoil 64. The split cut 100 may be angled with respect to the engine central longitudinal axis A at an angle of about, for example, twenty degrees.

The split cuts 100 through the split damped outer shroud 66 separate each stator vane airfoil 64 to provide relative frictional movement therebetween. This frictional movement dampens vibrations within the stator array 60 through permission of relative motion between each stator vane airfoil 64 and the engine case 36-1. Typically, each of the vane clusters 70 is anti-rotated at one location between the split damped outer shroud 66 and the engine case 36-1.

The inner shroud 68 remains un-split. The seal land 80 is thereby directly mountable to the inner shroud 68 through, for example, brazing and without the conventional additional hardware. Furthermore, the seal land 80 may be a full ring attached to the multiple of vane clusters 70 that define the stator array 60. Such direct attachment without additional hardware facilitates minimization of the radial height of the inner annular cavity 84 that thereby increases engine efficiency.

The split cuts 100 are, for example, ten-thousandths of an inch wide (0.010"; 0.254 mm); however, other widths dependent upon other manufacturing machinery/methods will benefit herefrom. With the split damped outer shroud 66, the kerf loss from the split cuts 100 may be of concern as the stator vane airfoils 64 will deflect toward the adjacent stator vane airfoil 64 and thereby transmit the circumferential load to the final stator vane airfoil 64 that anti-rotates the entire cluster 70 within the engine case. This may potentially overstress all but the final anti-rotated stator vane airfoil 64 due to excessive deflection. If the stator vane airfoil does not deflect enough to reach the neighboring stator vane airfoil, the load may be transmitted through the inner shroud and be transferred from the inner shroud to the outer shroud which may overstress the anti-rotated stator vane airfoil 64.

To minimize or avoid the kerf loss, a spacer key 102 is mounted between a forward hook 104 and an aft hook 106 at each split cut 100. It should be appreciated that the forward hook 104 and the aft hook 106 are schematically illustrated and may be of various configurations and geometries such as a segmented geometry to facilitate assembly into the engine case 36 (see FIG. 1). A groove 108, 110 wider than the split cut 100 are located in the forward hook 104 and an aft hook 106 at each split cut 100 to receive the spacer key 102. The interface formed within each groove 108, 110 and the associated spacer key 102 provide a tolerance less than the width of the split cuts 100 for each stator vane airfoil 64. In one disclosed non-limiting embodiment, the tolerance within the groove 108, 110 for the associated spacer key 102 may be, for example, one-thousandths of an inch wide (0.001"; 0.025 mm); however, any tolerance less than the width of the split cuts 100 inclusive of zero as well as an interference fit will benefit herefrom.

Figure 7:
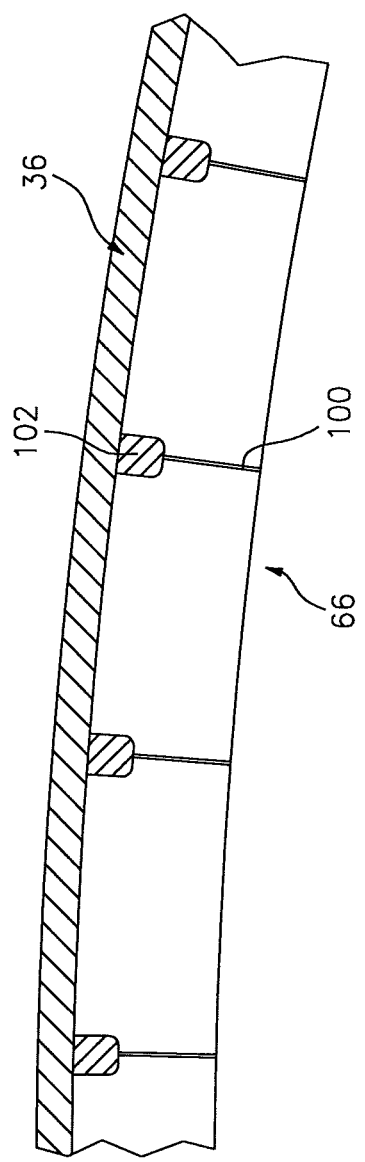
FIG. 7 is a front sectional view of the split damped outer shroud of FIG. 6.

The spacer keys 102, and the reduced tolerances provide thereby, backfills the kerf loss of the split cuts 100 to maintain a load between each of the stator vane airfoils 64 (see FIG. 7). This backfill prevents the circumferential airflow load on each stator vane airfoil 64 from being carried thru the solid inner shroud 68 to an anti-rotation feature. It should be appreciated that various anti-rotation features will benefit herefrom. The spacer keys 102 further operate as seals to facilitate the blockage of airflow leakage through the split cuts 100.

The split damped outer shroud 66 beneficially results in a weight reduction through direct attachment of the seal land 80 to the inner shroud 68 without the conventional additional hardware as well as facilitates minimization of the radial height of the inner annular cavity 84 (see FIG. 3) to thereby increase engine efficiency.

Figure 8:
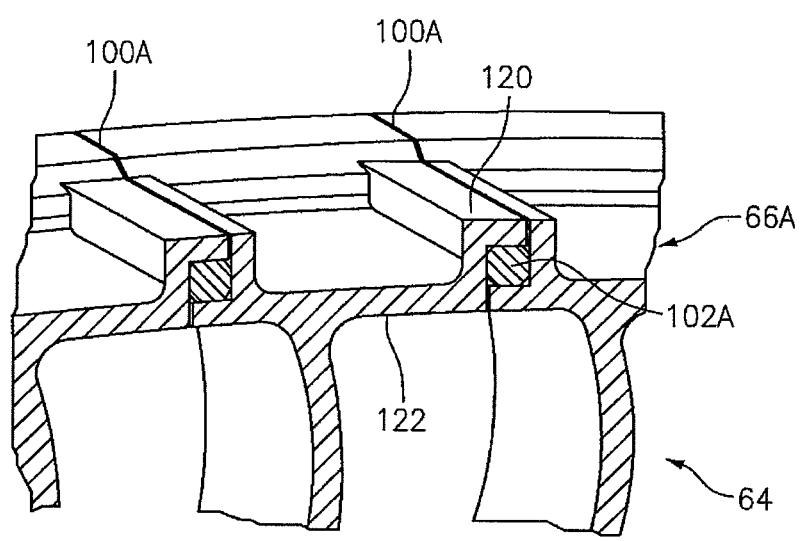
FIG. 8 is a perspective view of another split damped outer shroud vane cluster.
Figure 9:
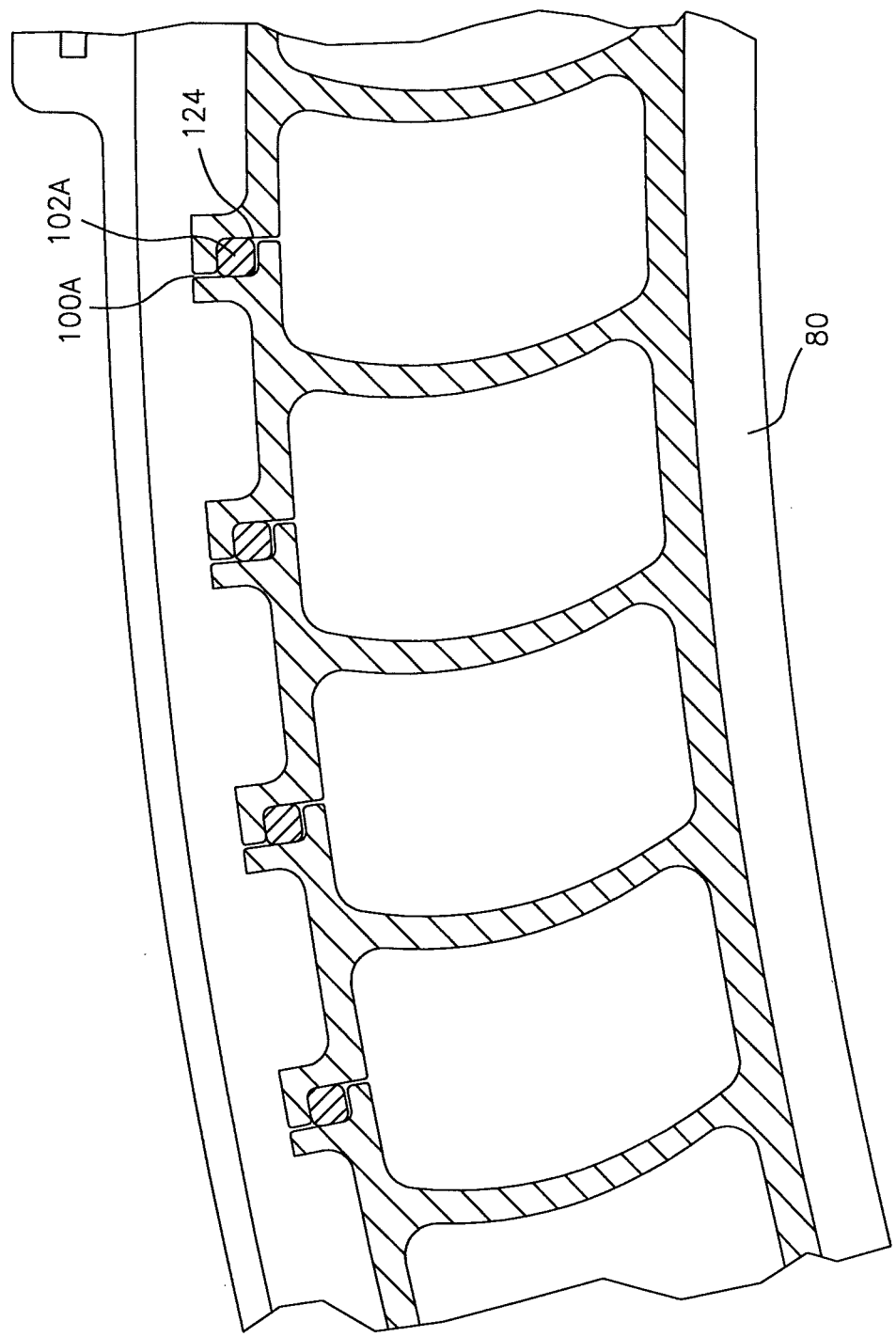
FIG. 9 is a lateral sectional view of the split damped outer shroud vane cluster of FIG. 8.

With reference to FIG. 8, according to another disclosed non-limiting embodiment each split cut 100A defines a shiplap that surrounds the spacer key 102A. The split cut 100A is offset between an outer periphery 120 and an inner periphery 122 of the split damped outer shroud 66A such that the spacer key 102A may be located therebetween in a channel 124 (see FIG. 9). The shiplap beneficially further operates to facilitate the blockage of core airflow leakage.

Figure 10:
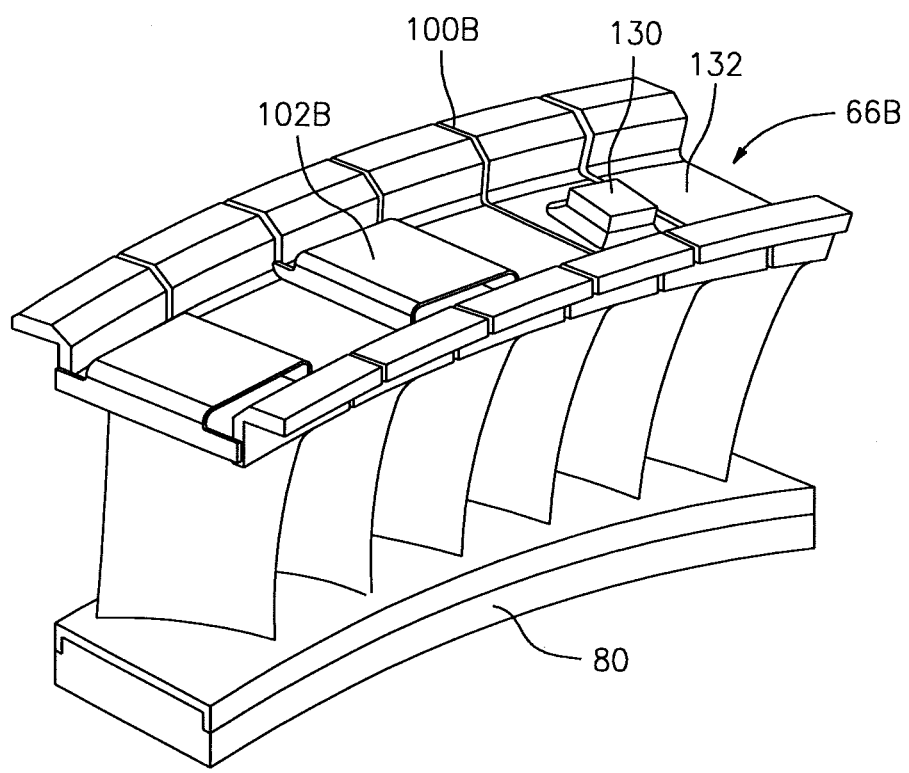
FIG. 10 is a perspective view of another split damped outer shroud vane cluster according.
Figure 11:
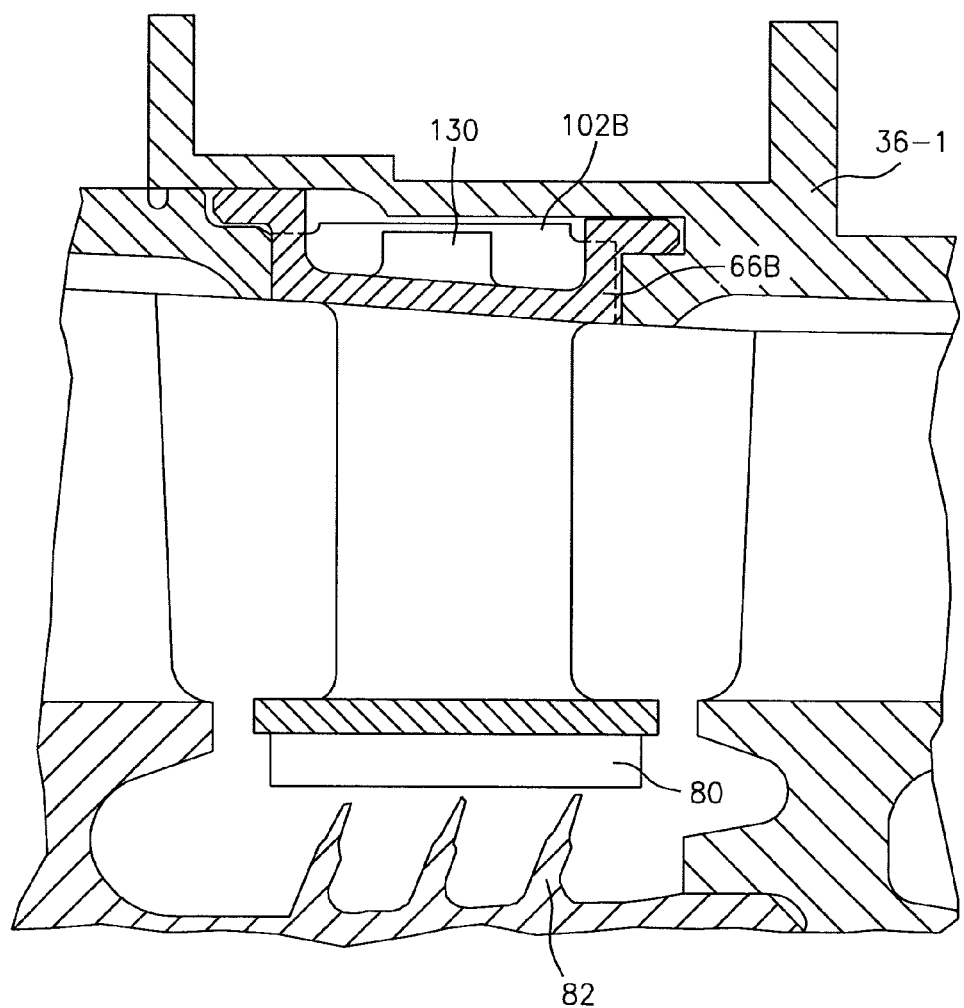
FIG. 11 is a longitudinal sectional view of the split damped outer shroud vane cluster of FIG. 10.

With reference to FIG. 10, according to another disclosed non-limiting embodiment each spacer key 102B spans two split cuts 100B. The spacer key 102B may be manufactured of, for example, a sheet metal detail that is generally U-shaped. Each spacer key 102B also may be at least partially supported by a pedestal 130 that extends from the split damped outer shroud 66 (see FIG. 11). The pedestal 130 supports and spaces the spacer key 102B from the outer periphery 132 of the split damped outer shroud 66B.

Figure 12:
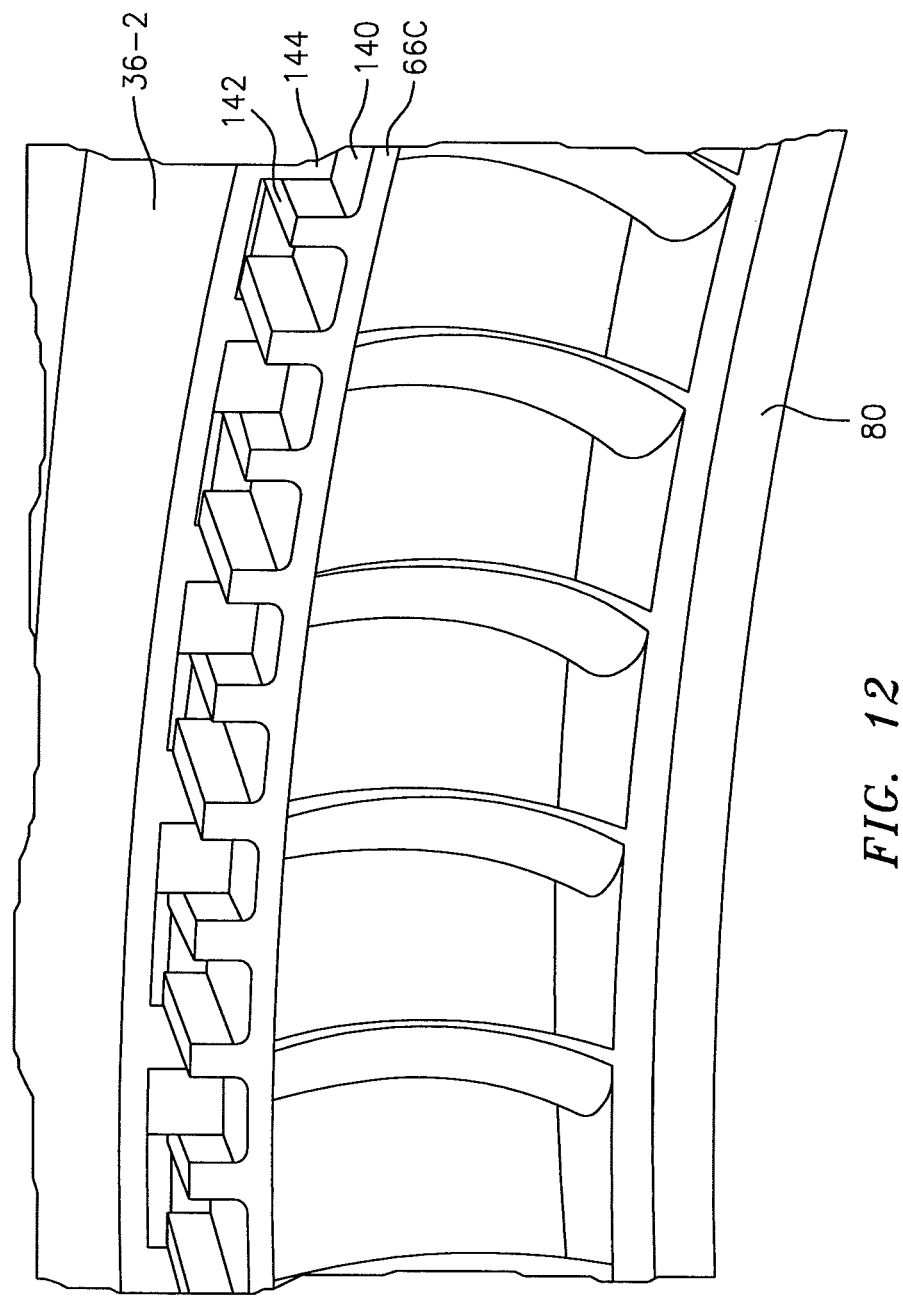
FIG. 12 is a perspective view of still another split damped outer shroud vane cluster.
Figure 13:
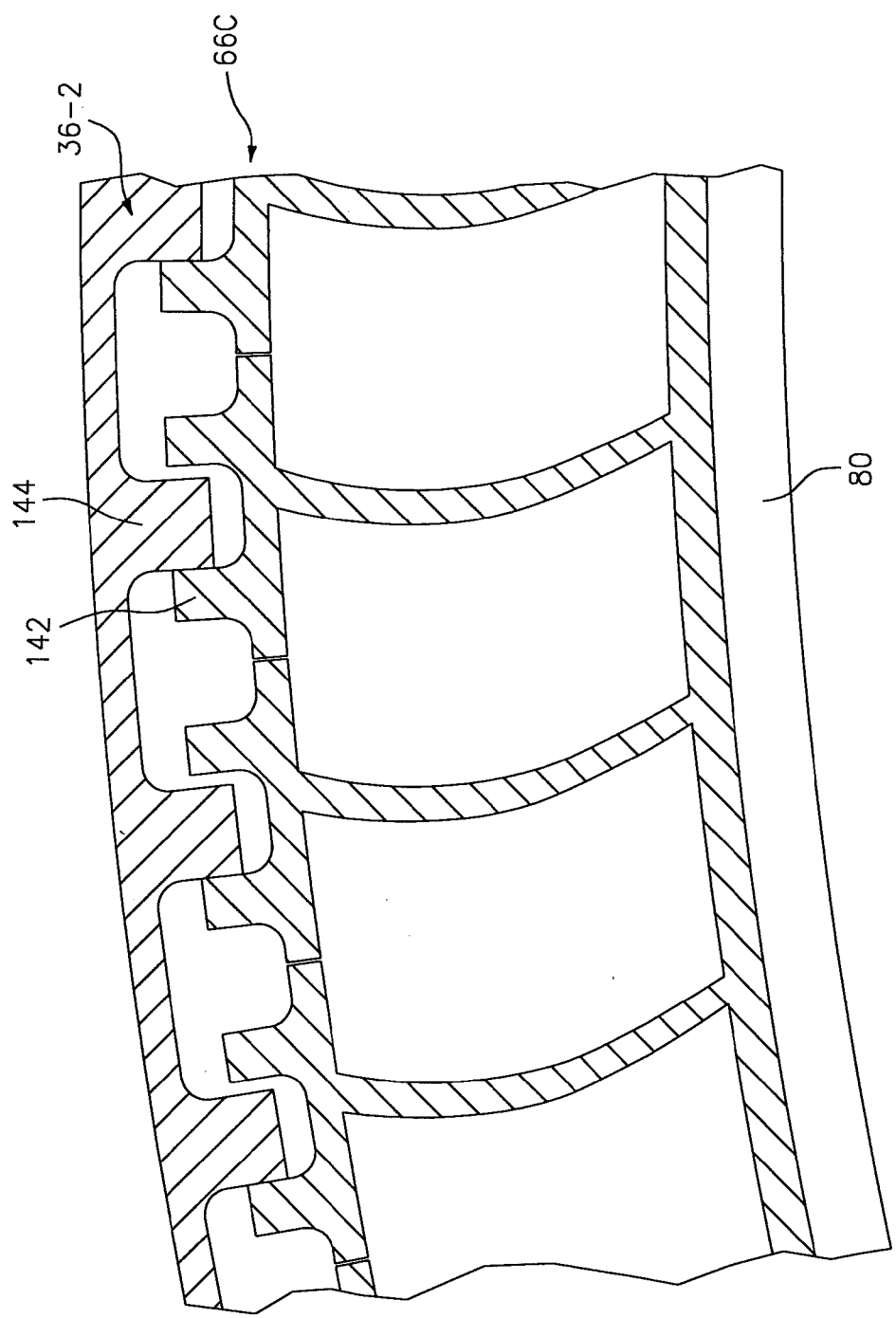
FIG. 13 is a lateral sectional view of the split damped outer shroud vane cluster of FIG. 12.

With reference to FIG. 12, according to another disclosed non-limiting embodiment an outer periphery 140 of the split damped outer shroud 66C includes an anti-rotation feature 142 adjacent to each of the multiple of stator vane airfoils 64. Each anti-rotation feature 142 engages a respective anti-rotation lug 144 in the engine case 36-2 (also shown in FIG. 13). The anti-rotation feature 142 radially outboard of each of the multiple of stator vane airfoils 64 segregates the circumferential load on each stator vane airfoils 64 and transfers each load directly to the engine case 36-2. It should be appreciated that the anti-rotation feature 142 may be utilized in combination with any of the above-described embodiments.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A vane cluster, comprising:
a portion of a split damped outer shroud comprising a plurality of shroud segments and a plurality of split cuts, wherein each laterally adjacent pair of said shroud segments is separated by a respective one of said split cuts;
an unsegmented inner shroud portion spaced from the portion of said split damped outer shroud;
a multiple of stator vane airfoils that extend between the portion of said split damped outer shroud and said unsegmented inner shroud portion; and
a plurality of spacer keys, each of said spacer keys arranged with at least one of said split cuts, wherein a first of said spacer keys extends laterally between and laterally contacts a radially extending first surface of a first of said shroud segments and a radially extending second surface of a second of said shroud segments, and said first surface is substantially parallel with said second surface.

2. The vane cluster as recited in claim 1, wherein each of said split cuts is between a respective adjacent pair of said stator vane airfoils.

3. The vane cluster as recited in claim 2, wherein each split cut is about ten-thousandths of an inch wide (0.010"; 0.254 mm).

4. The vane cluster as recited in claim 1, wherein each spacer key extends between a forward hook and an aft hook of said split damped outer shroud.

5. The vane cluster as recited in claim 1, wherein each spacer key defines an interference fit interface with said split damped outer shroud.

6. The vane cluster as recited in claim 1, wherein each spacer key defines an interface with said split damped outer shroud of one-thousandths of an inch wide (0.001"; 0.025 mm).

7. The vane cluster as recited in claim 1, wherein each spacer key defines an interface with said split damped outer shroud of about zero.

8. The vane cluster as recited in claim 1, further comprising a shiplap that surrounds each spacer key.

9. The vane cluster as recited in claim 1, further comprising an anti-rotation feature that extends from said split damped outer shroud adjacent each of said multiple of stator vane airfoils.

10. The vane cluster as recited in claim 1, further comprising a seal land mounted directly to said inner shroud.

11. The vane cluster as recited in claim 1, further comprising a seal land brazed to said inner shroud.

12. The vane cluster as recited in claim 11, wherein said seal land is a full hoop.

13. A vane cluster, comprising:
a split damped outer shroud comprising a plurality of shroud segments and a plurality of split cuts, wherein each laterally adjacent pair of said shroud segments is separated by a respective one of said split cuts;
an inner shroud spaced from said split damped outer shroud;
a multiple of stator vane airfoils that extend between said split damped outer shroud and said inner shroud; and
a plurality of spacer keys, each of said spacer keys arranged with at least one of said split cuts, wherein a first of said spacer keys extends laterally between a first surface of a first of said shroud segments and a second surface of a second of said shroud segments, and said first surface is substantially parallel with said second surface;
wherein said spacer key extends between each two of said multiple of split cuts.

14. A vane cluster, comprising:
a split damped outer shroud;
an inner shroud spaced from said split damped outer shroud; and
a multiple of stator vane airfoils that extend between said split damped outer shroud and said inner shroud, wherein said split damped outer shroud includes a split cut between each of said multiple of stator vane airfoils;
a spacer key adjacent each split cut, wherein said spacer key extends between each two of said multiple of split cuts; and
a pedestal that extends from said split damped outer shroud to at least partially support said spacer key.

15. The vane cluster as recited in claim 14, wherein each spacer key is generally U-shaped.

16. A method of damping a stator array in a gas turbine engine, the method comprising:
locating a multiple of split cuts in a split damped outer shroud to provide relative frictional movement between each of a multiple of stator vane airfoils, wherein said split damped outer shroud comprises a plurality of shroud segments, and each laterally adjacent pair of said shroud segments is separated by a respective one of said split cuts;
locating a respective one of a plurality of spacer keys adjacent each of said split cuts, wherein a first of said spacer keys extends laterally between a first surface of a first of said shroud segments and a second surface of a second of said shroud segments, and said first surface is substantially parallel with said second surface; and
bridging each two of the multiple of split cuts with one said spacer key.

17. The method as recited in claim 16, further comprising:
anti-rotating the stator array at each of the multiple of stator vane airfoils.

18. The method as recited in claim 16, wherein the first of the spacer keys is configured to backfill a kerf loss of a respective one of the split cuts to maintain a load between the first of said shroud segments and the second of said shroud segments.

* * * * *